United States Patent Office 2,706,151
Patented Apr. 12, 1955

2,706,151

PROCESS AND COMPOSITION FOR PROMOTING UNIFORM SEED GERMINATION

Edgar W. Clarke, Laurel Springs, N. J., and Robert B. Doan, Drexel Hill, and Vincent J. Keenan, Ardmore, Pa., assignors to The Atlantic Refining Company, Philadelphia, Pa., a corporation of Pennsylvania No Drawing. Application June 25, 1952,
Serial No. 295,566

The portion of the term of the patent subsequent to September 14, 1971, has been disclaimed and dedicated to the Public 8 Claims. (Cl. 71—1)

This invention relates to plant growth stimulants, and particularly is directed to novel compositions and processes, utilizing such compositions, for promoting both early and substantially complete, uniform germination of plant seeds, such as truck garden seeds.

The advantages and desirability of harvesting an entire crop of vegetables at the optimum point of maturity in a single harvesting operation are readily apparent. Thus, a truck garden operator could place on the market his entire yield of vegetables of uniform maturity at a lower cost because of the saving of time and expense inuring to his benefit by elimination of the necessity of repeated harvesting and of discarding overripe or immature vegetables. Unfortunately, however, plant seeds generally are not uniform with the result that heretofore it has not been possible to harvest an entire vegetable crop in a single operation without sacrificing a substantial portion of the yield because of immaturity and over-ripeness.

The production of a vegetable crop maturing uniformly is of considerable import to truck gardeners, and various attempts have been made in the past to accomplish this, however, without success. To improve crop uniformity truck garden farmers have resorted to seed selection, often by hand picking in the case of better grades of seed. While some improvement results from this practice, even hand picked seeds, it was found, do not germinate uniformly, and consequently many vegetable growers have adopted the practice of purchasing and planting uniform seedlings rather than to plant seeds. Many growers also have installed and utilize irrigation systems which have the effect of reducing the time required for seed germination and increasing the growth rate of vegetable plants; the use of such systems do not, however, result in any appreciable improvement in crop uniformity. Pickers must either go over the same field on several occasions to select the individual plants as they mature, or the entire crop may be harvested at one time and all over-ripe and immature plants discarded.

More recently, seeds have been dusted with sundry compositions for the purpose of stimulating the seeds and thereby improve germination, but without much success. It has been found difficult to apply a uniform coating to the seeds with the result that some seeds rot in the fields from excessive dosages and others are not stimulated because of insufficient applications.

Accordingly, it is one object of the present invention to provide a novel composition and process, utilizing such composition, for effecting more uniform maturing of vegetable crops.

Another object of the invention is to provide a composition for treating seeds and the plants resulting therefrom whereby to promote both early and substantially complete uniform germination of the seeds and simultaneous maturing of the resulting plants.

Other objects and features of the invention will be apparent from the detailed description which follows.

We have found that seeds, particularly vegetable seeds, may be stimulated in a manner so as to bring about substantially complete and more uniform germination of the seeds by contacting the seeds with a composition comprising a surface active agent, a water-soluble salt of chlorophyll, and a material yielding in water solution potassium and phosphate ions. The market improvement in the completeness and uniformity of seed germination, and in the uniformity of crop maturing which results from such composition, is quite unexpected since the three components of the composition individually or in any combination of two of them have little or no such effect on seeds. More specifically, in accordance with this invention, seeds are immersed in or otherwise contacted with an aqueous solution containing a surface active agent, a water-soluble salt of chlorophyll, and a material (a single compound or mixture of compounds) yielding potassium and phosphate ions, following which the seeds are planted in accordance with conventional practice. It has been found that the seeds will germinate substantially uniformly, and also earlier and more completely than if untreated or treated with any one or two of the three compounds of the composition.

The material yielding in aqueous solution potassium and phosphate ions may comprise a single compound or any suitable mixture of compounds which do not contain ions injurious to the seeds to be treated. Suitable materials, for example, are potassium ortho-phosphate, potassium hydrogen phosphate, potassium dihydrogen phosphate, potassium meta-phosphate, and mixtures of moro-ammonium phosphate and potassium chloride, of di-ammonium phosphate and potassium chloride, of mono-ammonium phosphate and potassium nitrate, of sodium phosphate and potassium chloride, of sodium phosphate and potassium nitrate, and any other mixture of compounds which will yield, in aqueous solution, potassium and phosphate ions and which do not contain other ions which would be injurious to the seeds or plants being treated.

Any water-soluble salt of chlorophyll may be employed in the novel composition of this invention. A convenient method of obtaining chlorophyll is by extraction of any green foliage with water. After harvesting the foliage, it is immediately shredded and vacuum dried to prevent degradation of the chlorophyll. The chlorophyll then is leached from the foliage simply by soaking the foliage in warm water. Chlorophyll, as it is extracted from green plants, is a magnesium salt of the basic structure of chlorophyll. Such naturally-occurring chlorophyll is made up of two magnesium salts, chlorophyll-a and chlorophyll-b. Various metal salts of the basic chlorophyll structure obtained by replacing the magnesium with various metals may be used, if desired. For example, the magnesium may be replaced with sodium, to form the water-soluble salt, sodium chlorophyllin. Similarly, sodium copper chlorophyllin is a water soluble derivative. Other examples of water-soluble chlorophyll derivatives are the potassium salts, and the double salts of sodium or potassium and a metal such as zinc, iron, and manganese. The chlorophyll salt need not be pure or relatively pure but may be associated with other materials, for example, the product may be associated with the colloidal proteins and pigments which together with the chlorophyll makes up the chloroplasts of the plant.

The surfaceactive agent used in the composition of the present invention may comprise any water soluble surface active agent, non-ionic, cationic, or anionic. Particularly suitable, however, are the alkyl benzene sulfonates such as di- and trialkyl benzene sulfonates having an alkyl group of at least 5 carbon atoms, and monoalkyl benzene sulfonates in which the alkyl group contains at least 9 carbon atoms and preferably 9 to 15 carbon atoms. Specific examples are the sulfonates of nonyl benzene, nonyl propyl benzene, nonyl dimethyl benzene, nonyl diethyl benzene, nonyl methyl ethyl benzene, nonyl methyl propyl benzene, nonyl ethyl propyl benzene, nonyl dipropyl benzene, decyl benzene, decyl toluene, decyl ethyl benzene, decyl propyl benzene, decyl dimethyl benzene, decyl diethyl benzene, decyl methyl ethyl benzene, decyl methyl propyl benzene, decyl ethyl propyl benzene, decyl dipropyl benzene, undecyl benzene, undecyl toluene, undecyl ethyl benzene, undecyl dimethyl benzene, undecyl diethyl benzene, undecyl methyl ethyl benzene, undecyl methyl propyl benzene, undecyl dipropyl benzene, dodecyl benzene, dodecyl toluene, dodecyl ethyl benzene, dodecyl propyl benzene, dodecyl dimethyl benzene, dodecyl diethyl benzene, dodecyl methyl ethyl benzene, dodecyl methyl propyl benzene, dodecyl dipropyl benzene, tridecyl benzene, tridecyl toluene, tridecyl ethyl benzene, tridecyl propyl benzene, tridecyl dimethyl benzene, tridecyl diethyl benzene, tridecyl methyl ethyl benzene, tridecyl methyl propyl benzene, tridecyl dipropyl benzene, tetradecyl benzene, tetradecyl toluene, tetradecyl ethyl benzene, tetradecyl propyl benzene, tetradecyl dimethyl benzene, tetradecyl diethyl benzene, tetradecyl methyl ethyl benzene, tetradecyl methyl propyl benzene, tetradecyl dipropyl benzene, pentadecyl benzene, pentadecyl toluene, pentadecyl ethyl benzene, pentadecyl propyl benzene, pentadecyl dimethyl benzene, pentadecyl diethyl benzene, pentadecyl methyl ethyl benzene, pentadecyl methyl propyl benzene, and pentadecyl dipropyl benzene, or mixtures thereof; or such sulfonates and mixtures thereof together with a minor proportion of a low molecular weight di- or trialkyl benzene sulfonate, such as xylene, methyl ethyl benzene, methyl propyl benzene, diethyl benzene, ethyl propyl benzene, trimethyl benzene, methyl diethyl benzene, methyl ethyl propyl benzene, and triethyl benzene.

As stated above, in accordance with this invention, seeds are treated with an aqueous solution of a surface active agent, a salt of chlorophyll, and a material capable of yielding potassium and phosphate ions. Preferably the seeds are soaked in the solution for a period of from 15 minutes to 2 hours or longer. A shorter soaking period may be used, such as 5 minutes; the improvement in completeness and uniformity is not as great as when the seeds are treated for longer periods.

The relative amounts of the three components in the aqueous solution may vary considerably, and it is not possible to set forth herein the optimum concentrations of the three components since that is dependent upon the type and efficiency of each component as well as the nature of the seeds to be treated. It is preferable, however, that the surface active agent be present in the solution in an amount of from 0.1% to 2% by weight since higher concentrations of the more efficient surface active agents, for example, the alkyl benzene sulfonates, have a tendency to cause the seeds to split open. The salt of chlorophyll may be present in an amount of from 0.1% or less up to a saturated solution. The material yielding potassium and phosphate ions preferably is present in an amount of from 0.05% to 1% by weight of the solution, although lesser or greater amounts may be utilized at the sacrifice of some of the improvement in completeness and uniformity of germination.

The present invention may be further illustrated by the following examples, which, however, are not to be construed as limiting the scope thereof. In these examples, a commercially available alkyl benzene sulfonate was employed, such agent having been produced by polymerizing a gaseous mixture containing predominantly propylene (80%) with minor amounts of propane and low boiling hydrocarbons, using a supported phosphoric acid catalyst at 500° F. and 400 lbs./sq. in. pressure, to obtain a mixture of propylene polymers from which was separated by fractional distillation, a fraction averaging 12 carbon atoms per molecule. This fraction was employed to alkylate benzene, using AlCl₃ as a catalyst at 150° F. The resulting mixture of alkylated benzenes was distilled to recover a fraction averaging 12 carbon atoms in the alkyl group (the fraction actually contained minor amounts of $C_9$ to $C_{15}$ alkyl benzenes). This fraction, upon sulfonation with 98% sulfuric acid at 160° F. yields the corresponding alkyl benzene sulfonic acids, which, after separation from the spent sulfuric acid, were neutralized with sodium hydroxide and recovered as essentially sodium dodecyl benzene sulfonates containing a small amount of inorganic salts, i. e. sodium sulfate. It is to be understood, however, that the invention is not restricted to the use of the sodium alkyl benzene sulfonates, but contemplates other water-soluble salts of the alkyl benzene sulfonates such as the potassium, calcium, magnesium, ammonium, and substituted ammonium, e. g. triethanolammonium, diethanolammonium, and tetramethylammonium.

The general procedure for manufacturing sulfonates of this type is described in various United States Patents, including U. S. Nos. 1,992,160; 2,232,118; 2,430,673; 2,477,372; and 2,477,383, and does not constitute any part of the present invention.

Five different types of seeds, as indicated below, were immersed separately for twenty minutes in an aqueous solution containing 0.10% of the sodium dodecyl benzene sulfonate (referred to in the tables below as sulfonate), 0.1% potassium acid phosphate, and 1.0% water-soluble chlorophyll derivative, obtained, as above described, by leaching green foliage with water. 250 treated seeds of each type were then planted in a sandy loam soil devoid of organic matter and having the following analysis (ASTM Test D4 22–39): 81.0% sand; 13.0% silt; and 6.0% clay. For the purpose of comparison, additional portions (250 seeds in each portion) of each of the five types of seeds were immersed for twenty minutes in water or in one or a combination of two of the above components of the novel composition as indicated below in the tables, and then were planted in the same type of soil as the seeds treated with the composition of the invention. From time to time, visual inspections were made to determine the per cent germination of the seeds and the results of such determinations are presented in Tables 1 to 5.

TABLE 1

*Percent germination of giant thick leaf dandelion*

| Days After Planting of Seeds | Aqueous Solution in Which Seeds Were Immersed | | | | |
|---|---|---|---|---|---|
| | Pure Water | 0.1% Sulfonate | 0.1% Sulfonate and 0.1% $KH_2PO_4$ | 0.1% Sulfonate and 1.0% Chlorophyll | 0.1% Sulfonate, 0.1% $KH_2PO_4$ and 1.0% Chlorophyll |
| 0 | 0 | 0 | 0 | 0 | 0 |
| 12 | 0 | 0 | 0 | 0 | 2 |
| 15 | 0 | 0 | 0 | 0 | 6 |
| 18 | 0 | 8 | 6 | 14 | 24 |
| 21 | 4 | 14 | 10 | 18 | 42 |
| 24 | 4 | 18 | 24 | 22 | 88 |
| 27 | 6 | 22 | 28 | 26 | 94 |
| 30 | 6 | 26 | 32 | 34 | 96 |
| 33 | 8 | 30 | 36 | 40 | 96 |
| 36 | 8 | 32 | 38 | 42 | 96 |
| 39 | 10 | 32 | 44 | 50 | 96 |

TABLE 2

*Percent germination of green curled endive seeds*

| Days After Planting of Seeds | Aqueous Solution in Which Seeds Were Immersed | | | | |
|---|---|---|---|---|---|
| | Pure Water | 0.1% Sulfonate | 0.1% Sulfonate and 0.1% $KH_2PO_4$ | 0.1% Sulfonate and 1.0% Chlorophyll | 0.1% Sulfonate, 0.1% $KH_2PO_4$ and 1.0% Chlorophyll |
| 0 | 0 | 0 | 0 | 0 | 0 |
| 6 | 0 | 0 | 0 | 0 | 4 |
| 9 | 0 | 2 | 0 | 6 | 12 |
| 12 | 0 | 18 | 16 | 20 | 68 |
| 15 | 6 | 24 | 22 | 20 | 92 |
| 18 | 21 | 42 | 36 | 42 | 96 |
| 21 | 36 | 56 | 54 | 60 | 98 |
| 24 | 52 | 68 | 62 | 66 | 98 |
| 27 | 64 | 74 | 74 | 72 | 98 |
| 30 | 68 | 80 | 74 | 76 | 98 |

TABLE 3

*Percent germination of Georgia green collard seeds*

| Days After Planting of Seeds | Aqueous Solution in Which Seeds Were Immersed | | | | |
|---|---|---|---|---|---|
| | Pure Water | 0.1% Sulfonate | 0.1% Sulfonate and 0.1% $KH_2PO_4$ | 0.1% Sulfonate and 1.0% Chlorophyll | 0.1% Sulfonate, 0.1% $KH_2PO_4$ and 1.0% Chlorophyll |
| 0 | 0 | 0 | 0 | 0 | 0 |
| 6 | 0 | 0 | 0 | 0 | 0 |
| 8 | 0 | 0 | 0 | 0 | 0 |
| 10 | 0 | 0 | 4 | 2 | 8 |
| 12 | 0 | 14 | 10 | 18 | 46 |
| 14 | 12 | 20 | 20 | 26 | 72 |
| 16 | 32 | 44 | 52 | 46 | 92 |
| 18 | 56 | 66 | 70 | 64 | 96 |
| 20 | 74 | 78 | 86 | 80 | 96 |
| 22 | 80 | 88 | 86 | 84 | 98 |

TABLE 4

*Percent germination of romaine lettuce*

| Days After Planting of Seeds | Aqueous Solution in Which Seeds Were Immersed ||||||
|---|---|---|---|---|---|
| | Pure Water | 0.1% Sulfonate | 0.1% Sulfonate and 0.1% $KH_2PO_4$ | 0.1% Sulfonate and 1.0% Chlorophyll | 0.1% Sulfonate, 0.1% $KH_2PO_4$ and 1.0% Chlorophyll |
| 0  | 0  | 0  | 0  | 0  | 0 |
| 2  | 0  | 0  | 0  | 0  | 0 |
| 4  | 0  | 0  | 0  | 0  | 0 |
| 6  | 0  | 0  | 0  | 4  | 8 |
| 8  | 0  | 20 | 16 | 22 | 40 |
| 10 | 16 | 24 | 20 | 32 | 88 |
| 12 | 44 | 56 | 52 | 56 | 90 |
| 14 | 72 | 76 | 70 | 78 | 92 |
| 16 | 80 | 82 | 84 | 82 | 96 |
| 18 | 84 | 88 | 90 | 86 | 96 |

TABLE 5

*Percent germination of broccoli seeds*

| Days After Planting of Seeds | Aqueous Solution in Which Seeds Were Immersed ||||||
|---|---|---|---|---|---|
| | Pure Water | 0.1% Sulfonate | 0.1% Sulfonate and 0.1% $KH_2PO_4$ | 0.1% Sulfonate and 1.0% Chlorophyll | 0.1% Sulfonate, 0.1% $KH_2PO_4$ and 1.0% Chlorophyll |
| 0  | 0  | 0  | 0  | 0  | 0 |
| 3  | 0  | 0  | 0  | 0  | 0 |
| 6  | 0  | 0  | 0  | 0  | 0 |
| 9  | 0  | 0  | 0  | 0  | 0 |
| 12 | 0  | 8  | 6  | 4  | 14 |
| 15 | 0  | 22 | 28 | 20 | 64 |
| 18 | 12 | 30 | 28 | 28 | 88 |
| 21 | 38 | 56 | 62 | 50 | 92 |
| 24 | 52 | 64 | 70 | 62 | 96 |
| 27 | 56 | 70 | 74 | 68 | 96 |

From the above examples and the data set forth in Tables 1 to 5, it will be seen that the various types of seeds which were treated by the process and with the composition of the present invention germinated much more uniformly than similar seeds treated with either a mixture of the sulfonate and $KH_2PO_4$ or a mixture of sulfonate and chlorophyll. Further, it will be seen that seeds treated with the composition of the present invention germinated earlier and much more completely than the other seeds.

Specifically, it will be seen from Table 1 that 90% of the dandelion seeds treated with the novel composition germinated within a period of 15 days, as compared with 34% germination or less over the same period of time for the other seeds; and that 96% of the first mentioned seeds germinated, as compared with a total germination of not more than 50% for the other seeds.

It is to be understood that observations continued to be made for a considerable period after the last day reported in each of the tables without noting any further germination of the seeds, and therefore the per cent germination reported on the last day represents the maximum germination in each case.

From Table 2 it will be seen that over 90% of the endive seeds treated in accordance with the present invention germinated within a period of 12 days, as compared with about 55% or less for the other seeds over a like period of time. A total germination of 98% was obtained for seeds treated with the novel composition, as compared with a maximum value of 80% for the other seeds.

In the case of collard seeds (Table 3), about 92% of the seeds treated with the novel composition germinated within a period of 8 days, as compared with about 76% or less of the other seeds over a similar period. Also 98% of the first mentioned seeds germinated, as compared with a maximum of 88% for the other seeds.

In the case of romaine lettuce seeds (Table 4), about 90% of the seeds treated with the novel composition germinated within a period of 8 days with a total germination of 96%, as compared with about 80% or less for a like period in the case of the other seeds with a total germination of 90% or less.

From Table 5 it will be seen that 96% of the broccoli seeds treated in accordance with the present invention germinated over a period of 15 days, as compared with 70% or less for a similar period for the other broccoli seeds.

It has also been found that treatment of the seedlings, resulting from germination of the seeds treated in accordance with the present invention, with the novel composition of the invention will further stimulate the growth of the plants and, in some cases, may result in even more uniform maturing of the crops. The novel composition may be applied to the seedlings either in an aqueous solution or in a dry form.

We claim:

1. A composition for treating seeds to promote early and substantially complete uniform germination of such seeds, which comprises an aqueous solution of an alkyl benzene sulfonate in which the alkyl group contains 9 to 15 carbon atoms, a salt of chlorophyll, and a material yielding potassium and phosphate ions.

2. A composition for treating seeds to promote early and substantially complete uniform germination of such seeds, which comprises an alkyl benzene sulfonate in which the alkyl group contains from 9 to 15 carbon atoms, a salt of chlorophyll, and a material capable of yielding potassium and phosphate ions.

3. A composition for treating seeds to promote early and substantially complete uniform germination of such seeds, which comprises an alkyl benzene sulfonate in which the alkyl group contains from 9 to 15 carbon atoms, a salt of chlorophyll, and potassium phosphate.

4. A composition for treating seeds to promote early and substantially complete uniform germination of such seeds, which comprises an alkyl benzene sulfonate in which the alkyl group contains from 9 to 15 carbon atoms, a salt of chlorophyll, and potassium dihydrogen phosphate.

5. A process for promoting early and substantially complete uniform germination of plant seeds, which comprises treating said seeds with a composition comprising an aqueous solution of an alkyl benzene sulfonate in which the alkyl group contains 9 to 15 carbon atoms, a salt of chlorophyll, and a material yielding potassium and phosphate ions.

6. A process for promoting early and substantially complete uniform germination of plant seeds, which comprises treating said seeds with a composition comprising an alkyl benzene sulfonate in which the alkyl group contains from 9 to 15 carbon atoms, a salt of chlorophyll, and a material capable of yielding potassium and phosphate ions.

7. A process for promoting early and substantially complete uniform germination of plant seeds, which comprises treating said seeds with a composition comprising an alkyl benzene sulfonate in which the alkyl group contains from 9 to 15 carbon atoms, a salt of chlorophyll, and potassium phosphate.

8. A process for promoting early and substantially complete uniform germination of plant seeds, which comprises treating said seeds with a composition comprising an alkyl benzene sulfonate in which the alkyl group contains from 9 to 15 carbon atoms, a salt of chlorophyll, and potassium dihydrogen phosphate.

References Cited in the file of this patent

UNITED STATES PATENTS

| | | |
|---|---|---|
| 2,314,091 | Jones | Mar. 16, 1943 |
| 2,468,329 | Haycock | Apr. 26, 1949 |
| 2,534,787 | Mecca | Dec. 19, 1950 |
| 2,553,577 | Hale et al. | May 22, 1951 |
| 2,614,917 | Zuckel | Oct. 21, 1952 |
| 2,624,662 | Erickson | Jan. 6, 1953 |

FOREIGN PATENTS

| | | |
|---|---|---|
| 591,951 | Great Britain | Sept. 3, 1947 |